United States Patent

[11] 3,584,814

[72] Inventor Milford R. Murphy
 Arlington, Tex.
[21] Appl. No. 654,187
[22] Filed July 18, 1967
[45] Patented June 15, 1971
[73] Assignee Bell Aerospace Corporation
 Hurst, Tex.

[54] STABILITY AND CONTROL AUGMENTATION SYSTEM
 16 Claims, 10 Drawing Figs.
[52] U.S. Cl. ................................................. 244/77
[51] Int. Cl. ............................................... B64c 13/18
[50] Field of Search ........................................ 318/20.245;
 244/77 D, 77

[56] References Cited
 UNITED STATES PATENTS
2,998,210  8/1961  Carter ........................ 244/77 (D)
3,082,979  3/1963  Hendrick ..................... 244/77 (OV)
3,237,107  2/1966  Bresenoff et al ............. 244/77 (D)

Primary Examiner—Milton Buchler
Assistant Examiner—Jeffrey L. Forman
Attorneys—Richards, Harris & Hubbard, V. Bryan Medlock, Jr., Harold E. Meier and George Galerstein ABSTRACT: A stability and control augmentation system for a craft wherein a stabilizing signal is generated in response to external disturbances to activate a high gain stability feedback loop to introduce controlled angular rate. An operator control input activates both the stability feedback loop circuit and a control feedforward loop circuit to change the reference point for the feedback loop without altering the gain thereof. The high gain of the feedback loop dominates the response characteristics of the craft and provides effectively constant response characteristics through the operational envelope. The control feedforward loop circuit alters the reference point for feedback loop circuit so that the mechanical control input may be introduced to provide the desired control response.

INVENTOR
MILFORD R. MURPHY

ATTORNEY

FIG. 5 FREQUENCY IN RADIANS PER SECOND $$\frac{\psi_0}{\theta_t} = \frac{-12}{S(S+1)}$$

$$\frac{\psi_{100}}{\theta_t} = \frac{-67(S+0.03 \pm j\,0.41)}{S^2(S+0.72 \pm j\,2.3)}$$

$$H = \frac{0.125\,S^2(S+4)}{(S+0.4)(S+0.8)}$$

FIG. 6 FREQUENCY IN RADIANS PER SECOND

STABILITY AND CONTROL AUGMENTATION SYSTEM

THE INVENTION

This invention relates to stability augmentation systems and more particularly to systems in which there is augmentation of both stability and of control to improve the normal, inherent properties of the controlled body.

THE PRIOR ART

Existing systems directed at the augmentation of stability characteristics of an aircraft, as opposed to systems directed at establishment and maintenance of a flight attitude, possess several significantly objectional qualities. For example, aircraft systems generally have employed a feedback signal which opposes the pilot control input as well as the external disturbing functions (i.e., wind gust, weapon recoil, etc.). To avoid problems involved in such operation, the gain of the feedback loop of such system is set at a lower or compromised value. This has compromised both the stability and control characteristics of the aircraft.

Some such relatively simple systems operate in compromise of the desired stability control characteristics by employing an effectively constant feedback gain throughout the aircraft flight envelope. Such operation is undesirable in some instances. For example, the optimum feedback gain for hovering a helicopter would be too high for high speed forward flight.

In more complex systems, alteration of the gain to accommodate changing flight conditions is achieved by intervention of the pilot who can manipulate a control to change the feedback gain (and/or phasing). In still other systems, the feedback gain and phasing is altered automatically in response to sensed changes in the flight condition, principally changes in speed. These systems contribute to the improvement of the overall stability and control operating characteristics. However, they possess a basic deficiency in that they compromise control and stability.

Relatively simple systems employ a fixed compromise between control and stability. More complex systems, in response to changing flight conditions, employ an automatically varying optimum compromise.

A system in accordance with this invention represents a significant advance over prior systems in that no compromise between stability and control is required. Stability characteristics and control response characteristics are optimized through the entire significant control/response range of the aircraft.

The significant control/response range of a pilot/airframe system is fixed at its lower end by the reaction time of the pilot at which he is first capable of intelligently analyzing aircraft movement. At the upper end, the range is fixed by the time at which the pilot must begin to rely upon memory in order to analyze the aircraft motion.

SUMMARY

In accordance with this invention, there is provided a control and stabilization system having a high gain stability feedback loop with a conventional inner control loop that provides the airframe with an optimum damping characteristic in response to outside disturbance. A feedforward loop cooperatively acts with the stability feedback loop in response to an operator input to change the reference point for the feedback loop to provide the desired control response characteristics throughout the significant control/response range.

THE DRAWINGS

A more complete understanding of the invention and its advantages will be apparent from the specification and claims and from the accompanying drawings illustrative of the invention.

THE PREFERRED EMBODIMENTS

Figure 1:
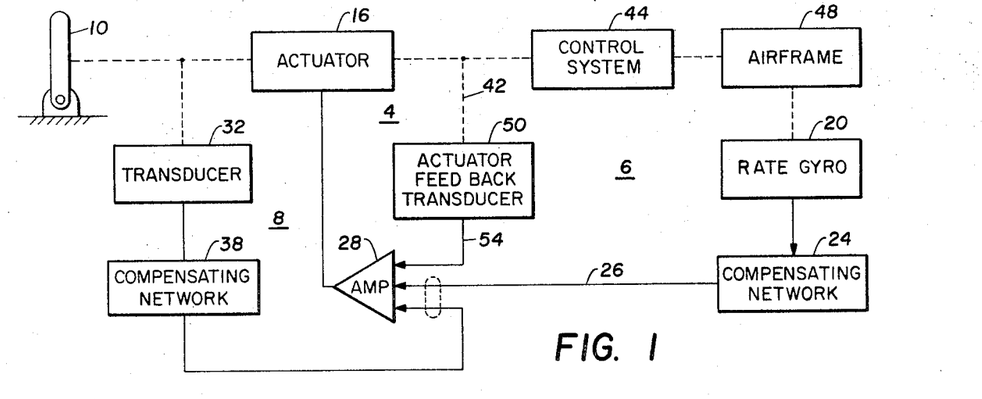
FIG. 1 is a block diagram of a stability and control augmentation system in accordance with the present invention.

In FIG. 1, a helicopter control and stabilization system is shown in configuration to embody the present invention and includes an inner control loop 4, a stability feedback loop 6, and a feedforward loop 8.

Included in the above system is an actuator 16 of a limited authority, series type which is electrohydraulically actuated. An actuator feedback transducer 50 is an electromechanical position feedback transducer for the electrohydraulic actuator 16. A rate gyro 20 senses attitude rate and provides the basic feedback signal. Components 16, 20 and 50 are well-known standard control hardware found in prior helicopter control systems.

A stability compensating network 24 employed herein is an electrical network complementing the rate gyro 20 within the feedback loop 6 to provide desired stability characteristics of the airframe 48 throughout the flight envelope.

A control compensating network 38 is an electrical network within the pilot feedforward loop 8 which operates on the electrical signal generated by transducer 32 upon movement of a control stick 10.

Control system 44 consists of standard control means for commanding a change of direction or attitude of flight of the airframe 48. It may be any one of the main rotor lateral control system, main rotor longitudinal control system or the tail rotor control system of a helicopter acting to control roll, pitch and yaw respectively. Thus for the present description a single axis stability augmentation control system will be described, it being understood that such a system will generally be employed for each of three axes when applied to aircraft such as a helicopter.

The system comprises two basic loops, the stability feedback (outer) loop 6 and the pilot feedforward loop 8, with a commmon inner control loop 4. To facilitate understanding of the entire system, the two basic loops and the inner control loop will first be considered relatively independently.

INNER CONTROL LOOP

The control or inner loop 4 comprises an amplifier 28 and an actuator 16 mechanically connected by means 42 to the actuator feedback transducer 50. An input electrical signal is applied to amplifier 28, as for example, through electrical connection 26 of the stability loop 6, and is amplified and applied to a torque motor winding in the hydraulic actuator 16 thereby causing the actuator to extend or retract, depending upon the polarity of the input signal to the amplifier. The extension or retraction of actuator 16 is detected by the transducer 50 which provides an opposing electrical signal to amplifier 28 through connection 54. Actuator 16 will continue to position the control system 44 until the input signals to amplifier 28, through connections 26 and 54, are equal and cancel each other. The magnitude of the control achieved by means of the control system 44 per unit of input to amplifier 28 from the channel 26 is the static closed loop gain of the control loop 4 and its value is determined the design of the airframe loop as will be hereinafter shown.

STABILITY FEEDBACK LOOP

The stability feedback loop 6 comprises the airframe 48, rate gyro 20, stability compensating network 24, the inner control loop 4 (28-16-50) and the control system 44. The basic function of the stability feedback loop 6 is to provide for a positioning of the control system 44 that opposes external disturbances of airframe attitude. Except for the characteristics of the stability compensating network 24, loop 6, as an entity, is conventional. Network 24 comprises a washout network and a lag lead-type network which shall be discussed hereinafter.

In operation, a movement of the airframe 48 causes the rate gyro 20 to generate on electrical signal which is transmitted through compensating network 24 and the amplifier 28 to the actuator 16. Actuator 16 will thus be energized to extend or retract. As described in connection with the inner control loop, actuator 16 actuates the control system 44 to close the loop.

PILOT FEEDFORWARD LOOP

The pilot feedforward loop 8 comprises a pilot control member 10, control motion transducer 32, control compensating network 38, and inner loop 4. Movement of the member 10 produces a proportionate change in electrical output from the mechanically connected transducer 32 which output is acted on by network 38. The network 38 produces a signal that combines with the pilot's mechanical input to actuator 16 to effect a change in the control system 44. The effect of compensating network 38 is to make the feedback loop gain frequency sensitive.

ANALYSIS

Feedback loops are used primarily to stabilize the output of a system to a reference or to change the characteristics of a system to obtain a specific response to an input. These two functions of the loop are not mutually exclusive and stabilizing characteristics will affect the nature of the control response, and vice versa. As above noted, if stability is considered to be of prime importance, the loop is normally closed with a comparatively high feedback gain so that the dynamic and static error of the output relative to a reference (usually the input) will be minimized. If control response is considered to be of prime importance, the loop is preferably closed with a comparatively low feedback gain. Where, as in most cases, both stability and control are considered substantially equally important, the loop is usually closed with a gain of intermediate or compromise value.

Figure 2:
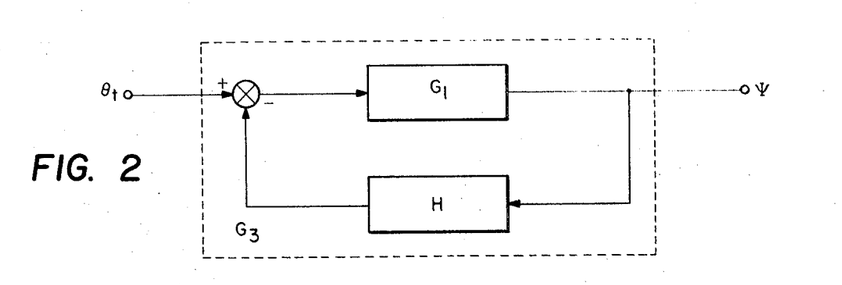
FIG. 2 is a block diagram of a system functionally equivalent to the system of FIG. 1 with the electrical portion of the pilot input disconnected.

In accordance with the invention, stability and control may be approached and controlled separately. More particularly, referring to FIG. 2, the block diagram illustrates a typical closed loop control system, where $\theta_t$ is an input signal, $\psi$ is the system output, $G_1$ is the transfer function of the basic airframe, H is the transfer function of the feedback loop, and $G_3$ is the closed loop transfer function which may be described mathematically as follows:

$$(\theta_t H\psi)G_1\psi$$
$$\psi/\theta_t = G_3 = (G_1/1_1H$$

If $G_1H$ is less than 1, then $G_3$ is approximately equal to $G_1$. Considering $G_1$ as the representative transfer function of an unaugmented airframe, then if $G_1H$ is less than 1, the resultant transfer functions $G_3$ is approximately equal to the transfer function of the airframe system, i.e., the response characteristics will be substantially determined the basic airframe; if $G_1H$ is greater than 1, the response characteristics of the system will be approximately equal to the inverse of the transfer function of the feedback loop, i.e., the response characteristics will be substantially determined by the stability feedback loop (H). When $G_1H$ is much greater than unity, the stability feedback loop characteristics dominate the airframe.

The manner in which the present invention achieves such a system will now be qualitatively illustrated with reference first to FIG. 3 where $G_1$ is the transfer function of the vehicle (referred to as the unaugmented airframe), $G_c$ is the transfer function of the pilot's electrical feedforward loop, $\theta_t$ is the control input, $G_3$ is the resultant transfer function of the closed loop, and $\psi$ is the system output. The closed loop is provided with a relatively high feedback gain that dominates the response characteristics of the basic airframe and results in an augmented airframe with relatively standard or constant response characteristics throughout the significant control/response range. $G_c$ is the provided so that the resultant transfer function $G_cG_3$ will have the desired control response characteristics. Thus, when an external disturbance is applied to $G_1$, the response is solely dependent upon the characteristics of the closed loop $G_3$. When a control input of $\theta_t$ is applied via $G_c$, the response will be dependent upon the characteristics of the transfer function $G_cG_3$.

Figure 3:
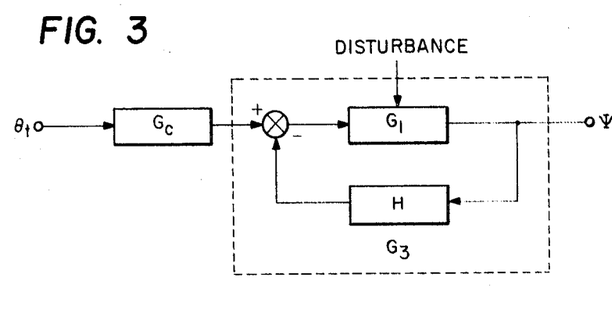
FIG. 3 is a block diagram of a system that is functionally equivalent to the system of FIG. 1 with the pilot's mechanical input disconnected.

The system illustrated in FIG. 1, reduced to component systems or loops would be of the form shown in FIGS. 2 and 3. The block diagram of FIG. 2 represents a functional equivalent of the system of FIG. 1, with the electrical portion of the pilot feedforward loop 8 disconnected leaving operative only the pilot's mechanical input by means of member 10 to actuator 16 and the stability feedback loop 6 which obviously is the loop that operates on a disturbance input.

THe system represented in the block diagram of FIG. 3 is the functional equivalent of the system of FIG. 1 with the pilot's control member 10 disconnected from actuator 16, there remaining operative the electrical portion of the pilot feedforward loop 8 and the stability feedback loop 6. This is the system upon which the pilot electrical control input acts through transducer 32 and network 38.

The systems of FIG. 2 and FIG. 3 include the stability feedback loop 6. This is the loop or circuitry upon which external disturbances act and it is the loop which provides optimum stability characteristics throughout the aircraft's significant control/response range.

The systems of FIGS. 2 and 3 can be considered as two parallel systems upon which the pilot control acts. They can be added to produce a resultant transfer function that represents the relationship of the output of the system to pilot control input, or, in other words, the control response of the craft.

Figure 4:
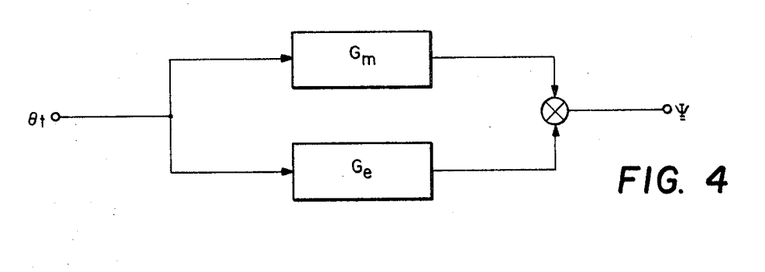
FIG. 4 is a diagrammatic representation of the parallel relationship of the systems of FIGS. 2 and 3.

Referring to FIG. 4, there is shown a block diagram of the systems of FIGS. 2 and 3 combined into a single system. $G_e$ is the transfer function of the electrical input control system and $G_m$ is the transfer function of the mechanical input control system. Using the approach employed to determine $G_3$ of FIG. 2, the input signal, $\theta_t$, is related to the output signal, $\psi$, by the following equation:

$$\psi/\theta_t = \frac{1}{1/G_m} \Big/ 1 + G_e/G_m$$

$$= 1 \Big/ \frac{1}{G_m + G_e}$$

$$= G_m + G_e$$

The ability of one or the other of the tow systems to dominate the control function will be made clearer by straight line approximations of the $G_m$ and $G_e$ curves on semilog paper.

Assume that $G_e$ represents the transfer function $G_cG_3$ (the resultant transfer function of the electrical portion of the pilot feedforward loop and the stability feedback loop). Since $G_3$, the transfer function of the stability feedback loop, is determined based upon consideration for stability purposes, the transfer function $G_c$ (electrical portion of the pilot feedforward loop) may furnish the desired values of the term $G_e/G_m$. IN OTHER WORDS, $G_c$ is a design variable that is used to control the characteristics of the resultant transfer function $G_m+G_e$ to produce the desired control response.

The procedure followed in achieving the present stabilization and control augmentation system will now be explained and illustrated with reference to yaw stability and control in hovering flight and at 100 knots forward speed. Well-known feedback control technology will be employed along with applicable mathematical procedures.

The first step, directed at stability alone, will deal with both hovering and 100 knot forward speed; the second step, directed at development of yaw control response, will be limited to the 100 knot forward speed condition.

STEP NO. 1

Figure 5:
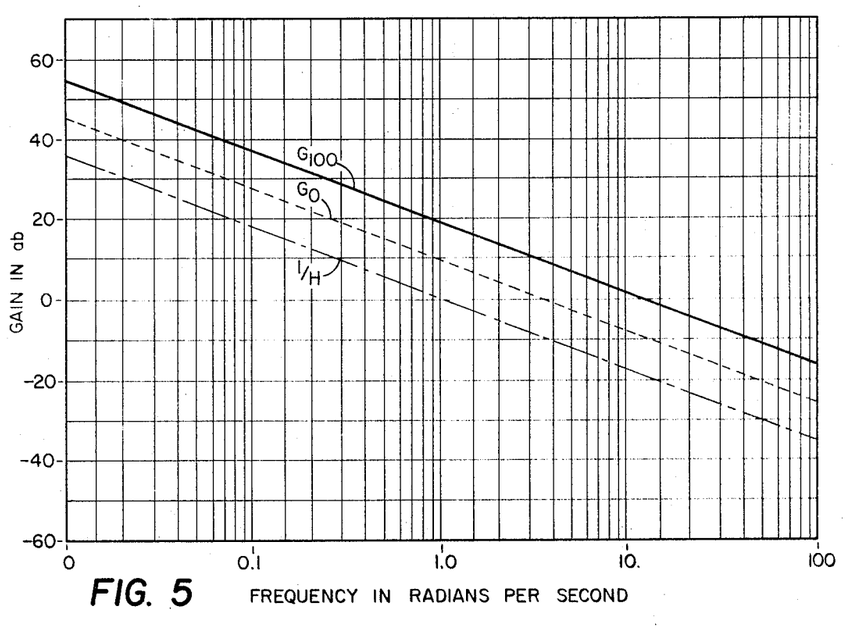
FIG. 5 is a Bode plot illustrating the relationship between the transfer functions of an airframe and its stabilizing system.

The primary objective is to provide a stability feedback transfer function H (see FIG. 2) that will provide a well damped airframe throughout the flight envelope. Referring to FIG. 5 there is shown simplified transfer functions of the response of a basic airframe to external disturbances for hovering and 100 knot forward speed and plotted on conventional Bode plot (less phase) by lines $G_0$ and $G_{100}$, respectively. Bode plots involve loop gain (in db.) as a function of frequency plotted in radions per second.

Where the transfer functions $G_1H$ is less than one, the resultant closed loop transfer function is approximately equal to $G_1$, i.e., dominated by the unaugmented airframe. Where the transfer function $G_1H$ is greater than one, the resultant closed loop transfer function is approximately equal to 1H, i.e., dominated by the feedback loop or the augmented airframe. Thus, it will be appreciated that a stability feedback loop having a gain greater than one through its entire flight spectrum will provide a system in which the basic stability characteristics of the aircraft will be dominated by characteristics of the feedback loop.

Referring to FIG. 5, the line 1/H represents the reciprocal of a feedback transfer function H. It will be understood that representation in terms of 1/H means that for any given frequency if the point on the 1/H line is lower than the $G_0$ and $G_{100}$ lines, then for that frequency, the transfer function $G_1H$ will be greater than unity and the response characteristics will be dominated by the characteristics of feedback loop as opposed to the unaugmented airframe. If a point on the 1/H line is higher than the corresponding points on lines $G_0$ and $G_{100}$, then the transfer function $G_1H$ will be less than unity and the response characteristics to external disturbances will be dominated by the unaugmented airframe.

In accordance with this invention, the feedback loop is provided, as shown in FIG. 5, such that the 1/H line is lower than lines $G_0$ and $G_{100}$ with values that provide the desired stability response throughout the significant portion of the flight spectrum.

In practice, the straight line relationships illustrated in FIG. 5 are not encountered. More representative of actual practice are the relationships illustrated in FIG. 6, which is a Bode plot (less phase) for yaw transfer functions in hovering and 100 knots forward flight for a system embodying the present invention.

Figure 6:
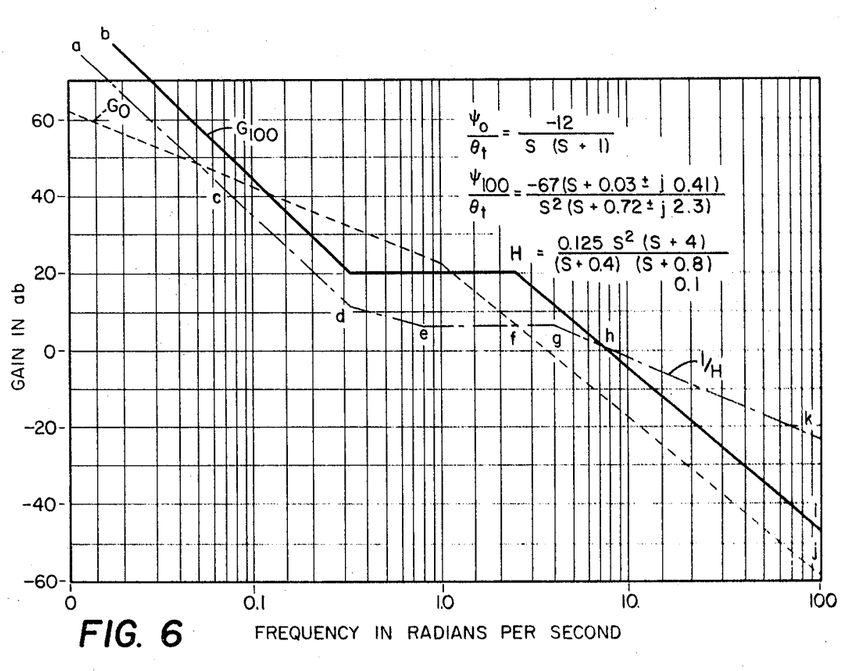
FIG. 6 is a Bode plot illustrating the stability transfer function of a helicopter airframe augmented by the system of this invention.

Considering line 1/H, section $d$–$e$ represents desirable gain values for a given range of frequencies. If section $d$–$e$, were extended as a straight line function into the higher frequency region, the stability feedback loop would also dominate at the higher frequencies. This would cause the stabilization system to be susceptible to and react to all types of high frequency disturbances, including noise, vibrations, etc. Consequently, section $g$–$k$, instead of being a straight extension of section $d$–$e$, is elevated to intersect the $G_{100}$ line at $h$. As a result, the augmented airframe dominates for 100 knot forward speeds at frequencies up to approximately 7+ rad/sec. Beyond 7+ rad/sec. the unaugmented airframe dominates. The point of 7+ rad/sec. is selected to be beyond the point of the pilot's control frequency spectrum. As previously defined, this represents the limit at which the pilot is first capable of intelligently analyzing the aircraft motion. Thus, domination of stability by the unaugmented airframe at frequencies greater than 7+ rad/sec. will have no deleterious effect on the control function by the pilot. Similar considerations with respect to hovering apply to determination of point $f$.

It will be appreciated that the intersection points $f$ and $h$ (points at which $G_1H$ is equal to one) are highly sensitive to phasing and require adequate phase margins for purposes of stability. In a practical application of this invention, a phase margin of approximately 60° was maintained from points $f$ to $h$.

Section $d$–$e$ is not extended as a straight line function into the lower frequencies but is interrupted at point $d$, as shown. This permits a more practical circuitry, that is it eliminates the necessity of excessively large capacitors, etc. The 1/H line is maintained beneath $G_0$ and $G_{100}$ lines so that the augmented airframe dominates throughout the entire lower frequency range. A crossover point could well have been established at a frequency below that at which the pilot must begin to rely upon memory for a control action, i.e., around 0.5 rad/sec., and the augmented airframe would still be dominant throughout the significant control range.

The feedback transfer function H is mechanized by means of the rate gyro 20 and network 24 is in the stability feedback loop 6 (FIG. 1). Network 24 is made up of a lag network and a washout network. The lag network operates on the attitude rate signal to produce the effect from $e$ to $k$, and the washout network operates on the attitude rate signal to produce the effect from $a$ to $e$ (FIG. 6). The straight line approximation from $d$ to $e$ is representative of the basic gyro attitude rate gain which in one embodiment was 0.624° of $\theta_t$ per degree per second of attitude rate.

Figure 7:
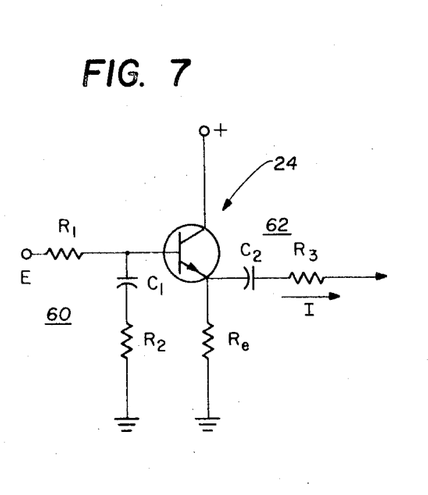
FIG. 7 is a schematic diagram of a stability feedback loop compensating network.

Referring to FIG. 7, there is shown a representative circuit for network 24. Included is a lag network 60 and a washout network 62. The frequency breaks at $e$ and $g$ (FIG. 6) are determined by $(R_1+R_2) C_1$ and $R_2C_1$, respectively, of the lag network; the frequency break at $d$ is determined by $R_3C_2$ of the washout network.

At the upper portions of the frequency spectrum from 1 to 10 radians per sec., the lag network 60 operates on the rate gyro signal to maintain a relatively constant phase of 65°±10° over a decade frequency change. This permits accommodation of large changes in the transfer function of the airframe—i.e., changes in airspeed, altitude, gross weight, etc. Another effect contributed by use of the lag network is that abrupt external disturbances are prevented from introducing equally abrupt corrective control action and there is, instead, a relatively gradual introduction of corrective control tending to reduce pilot discomfort and to provide the aircraft with a more acceptable platform for such functions as gunnery, etc.

Figure 8:
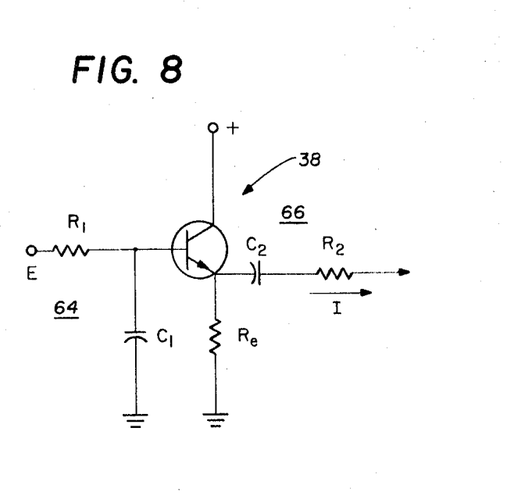
FIG. 8 is a schematic diagram of a feedforward loop compensating network.

The washout network 66 acts to provide a new base reference from which control changes can be measured, which is of benefit in the lower frequencies at which the washout network is activated, because of the relatively long term control inputs involved For example, in hovering, the control pedals are moved by the pilot to an off center position and are retained in that position. Inasmuch as the system is sensitive to "change" rather than "position," the washout network blocks a steady-state rate signal.

The washout network 66 is the pilot loop and the washout network 62 in the feedback loop effect cancellation when the pilot introduces a command and thus the pilot input acts independent of the response of the control loop to disturbance forces. As above stated, it is preferred that the two washout networks have identical characteristics in order to assure such cancellation.

Thus, the resultant stability response of a typical airframe is defined by line $a$-$c$-$d$-$e$-$f$-$j$ for the hovering condition ($G_0$) and line $c$-$d$-$e$-$f$-$g$-$h$-$i$ for the 100 knot forward speed condition ($G_{100}$). (FIG. 6). It will be noted that in what is considered the significant control/response range of the pilot/airframe system (c-d-e-f) the stability characteristics will be essentially the same for both hovering and 100 knot forward speed and the pilot loop can be provided on this constant to produce specific responses.

STEP NO. 2

Line 1/H in FIG. 6 for values of GH>1, i.e., from $i$ to $a$, represents the augmented airframe that is operated on by external disturbances and, according to the present invention, is part of the system upon which the pilot's mechanical input acts. This is represented by system $G_m$ of FIG. 4. The pilot's electrical input and the stability augmented airframe are considered as a separate system $G_e$, FIG. 4. Also as previously explained, the two systems $G_m$ and $G_e$ are considered in parallel. The present step in developing the structure and characteristic of $G_e$ function provision of a transfer function for the pilot's loop in series so that the resultant system will produce a specific response for pilot inputs.

The feedforward loop includes member 10, transducer 32, compensating network 38 and the inner loop 4. Motion of the control member 10 produces a change in the electrical output signal from the transducer 32 that is proportional to displacement of the control member. This signal is operated on by compensating network 38 and may be considered as a transfer function $G_c$ in series with the resultant transfer function $G_3$.

The present stability and control augmentation system as applied to the yaw system of a helicopter was intended to obtain a constant yaw rate (velocity) per unit of pilot control input. To obtain this particular response, network 38 of the pilot control loop should be identical to network 24 of the stability feedback loop. Of course, to obtain other specific time constants, as for filtering two cycle per revolution signals emanating from the main rotor, differences would be designed into the networks. However, for this application, network 38 substantially cancels the dynamic effects of network 24 leaving the rate gyro feedback term which is the controlled variable.

Referring to FIG. 8, there is shown a circuit for network 38, including a lag network 64 and a washout network 66. This circuit is substantially the same as network 24 shown in FIG. 7 except that the shunt resistor in lag network 64 has been omitted to provide a more favorable initial response. The resistor $R_2$ and the capacitor $C_2$ determine the low frequency break points and the resistor $R_1$ and capacitor $C_1$ determine the high frequency break points.

Figure 9:
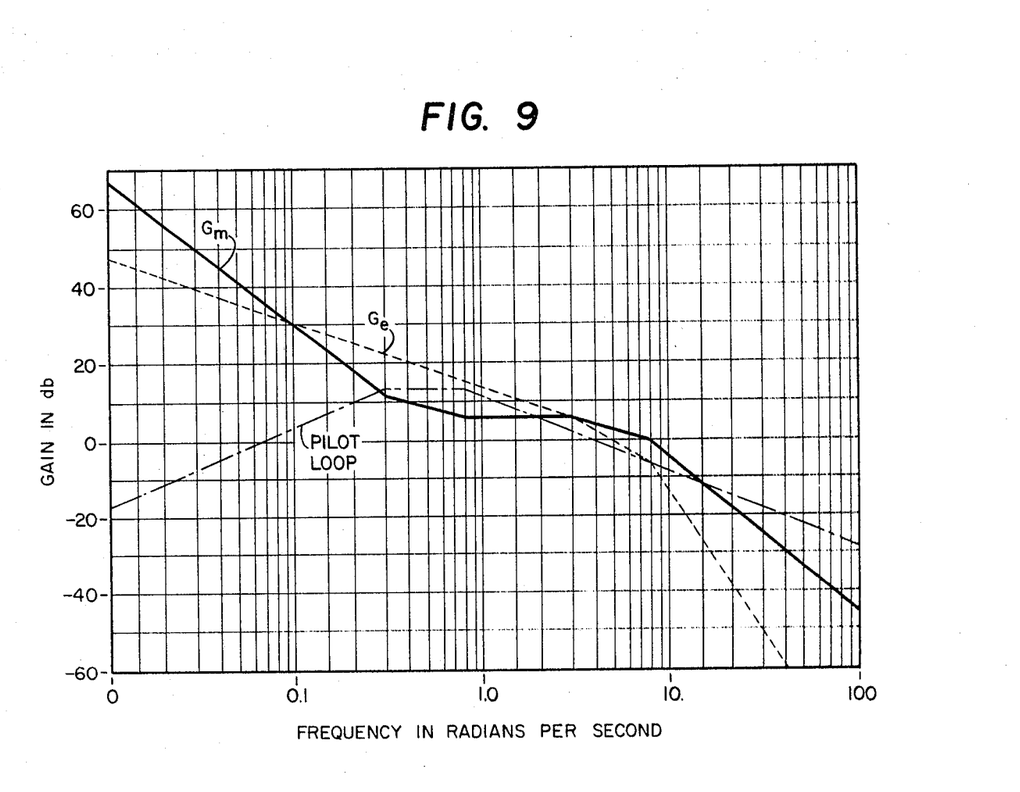
FIG. 9 is a Bode plot illustrating the control transfer function of a helicopter airframe augmented by a system in accordance with this invention.

Referring to FIG. 9, the transfer function of the stability augmented airframe $G_m$ of FIG. 4 is plotted along with a line ($G_e$) representing the desired transfer functions for the pilot's electrical inputs. It should be appreciated that the situation herein considered is equivalent to that illustrated in the block diagram of FIG. 3 which is the functional equivalent of FIG. 1 with the pilot's mechanical input 10 to the actuator 16 disconnected. There remains operative, the electrical portion of the pilot feedforward loop and the stability feedback loop. Inasmuch as the resultant transfer function for the pilot's electrical input is the result of the multiplication of the transfer functions of the stability augmented airframe and of the pilot loop, knowing the first two functions means that the transfer function of the pilot loop is readily determinable.

The pilot network is designed to effectively cancel the dynamic effects of the stability feedback loop network 6 except that the break frequency of 4 radians per second was deleted so that the network would provide attenuation in the high frequency spectrum and to effect an optimum initial response.

Having determined $G_e$, it now remains to sum the transfer functions $G_e$ and $G_m$, which summation is approximately indicated (FIG. 9) by the uppermost points of the two curves. The resultant transfer function shows that the system performs like an integrator for pilot inputs over the frequency spectrum from 0.8 radians per second to 8.0 radians per second and has a time constant of 0.125 seconds and an acceleration gain of about 0.64 radians per second per second per radian input. So, the mathematical model of the transfer functions for pilot control is:

$$G_e + G_m = \frac{-0.64(12.5S+1)}{S^2(0.125S+1)}$$

$$= \frac{-64(S+0.08)}{S^2(S+8)}$$

and the mathematical model of the transfer function on the stability augmented airframe is:

$$G = \frac{-67(S+0.4)(S+0.8)}{S^2(S+5.2S \pm j3.2)}$$

Figure 10:
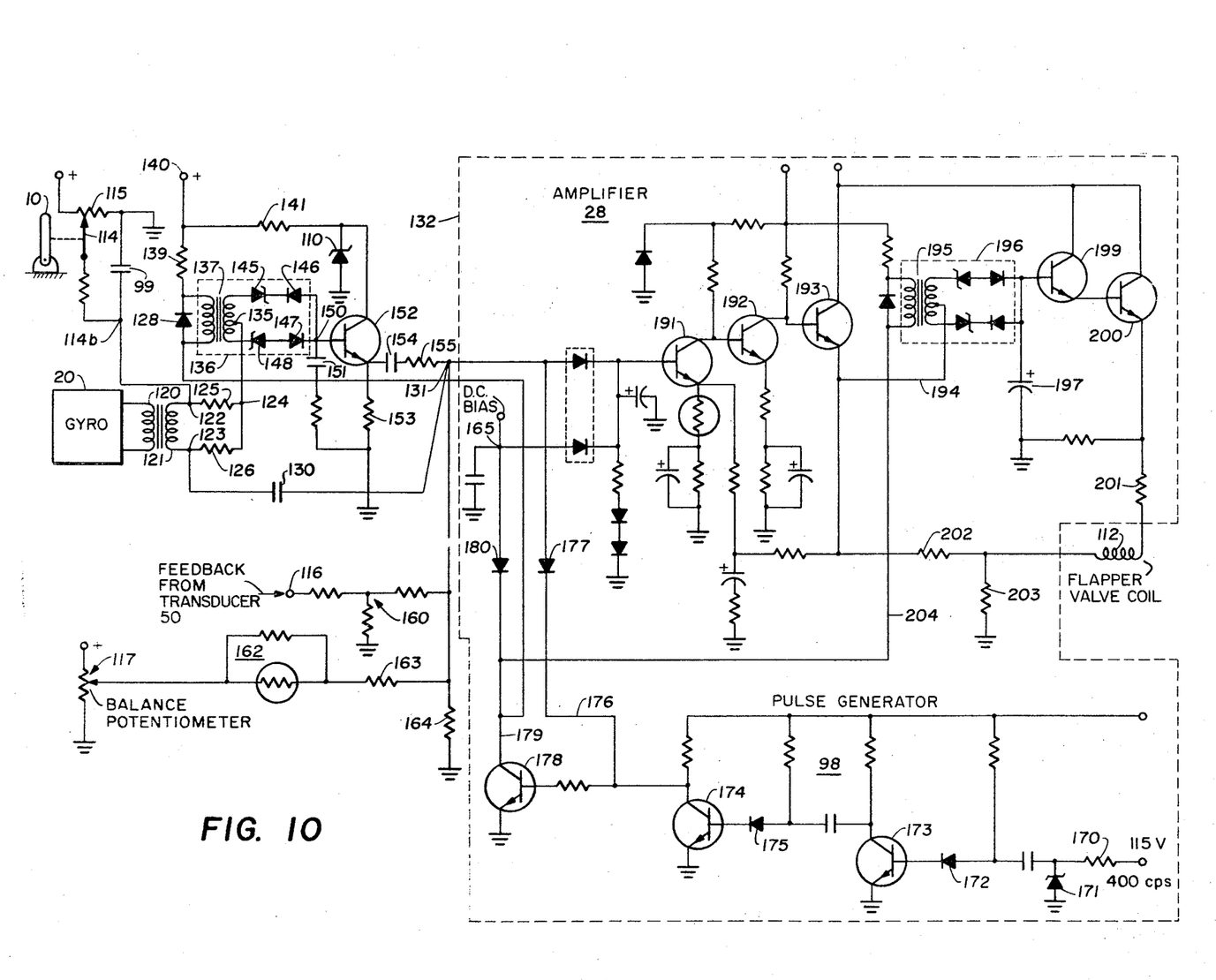
FIG. 10 is a schematic of a preferred embodiment of this invention.

Referring to FIG. 10, in accordance with one embodiment of the invention, the rate gyro 20 provides a first input error signal for control of a voltage applied to a flapper valve core 112 of the actuator 16. A second error signal is applied by the pilot actuating the control 10 which moves the tap 114 on a potentiometer 115 to produce an error voltage at terminal 114b. A third source of error voltage is from the feedback transducer 50 connected to terminal 116. A fourth control 117 is provided for balance purposes.

The gyro 20 is provided with an output transformer primary 120 which is coupled to a secondary 121 connected across terminals 122 and 123. Terminals 122 and 123 are connected together at terminal 124 by way of resistors 125 and 126. The terminal 114 b is connected to the juncture of secondary 121 and resistor 125. The signal at terminal 123 is applied by way of a capacitor 130 to the input terminal 131 of an amplifier 132 A DC signal representative of the voltage at tap 114 and appearing across capacitor 99 is applied by way of resistors 125 and 126 to the center tap 135 of an input transformer 137 of a bilateral gate 136. The primary winding of the input transformer 137 is shunted by a diode 128. One terminal of the primary winding is connected by way of resistor 139 to terminal 140, the plus terminal of a DC supply source (not shown). The outer terminal of the primary winding of the transformer 137 is connected to the cathode electrode of a transistor 178 of a pulse generator 98. The pulse generator 98 is excited by a 115 volt, 400 cycle per second supply; as a result, the generator 98 produces negative going pulses at the rate of 400 pulses per second. The gate pulse is phased so that it opens gate 136 during the peak of the negative half-cycle for a period of 0.002 seconds. During this interval, a pulse current circulates in a loop which includes Zener diode 145, diode 146, diode 147 and Zener diode 148. Diodes 146 and 147 are connected at opposite polarities as are diodes 145 and 148. The common juncture 150 in the loop is connected by way of a capacitor 151 to ground and to the base electrode of transistor 152. The collector electrode of transistor 152 is connected to the terminal 140 by way of a resistor 141. The collector voltage is maintained constant by means of a Zener diode 110. The emitter is connected by way of resistor 153 to ground and by way of series capacitor 154 and resistor 155 to the input terminal 131 of the amplifier 132.

By this means, the voltage change produced by actuation of the tap 114 by the pilot adjusting the control element 10 is sampled and stored on capacitor 151. The combination of resistors 125 and 126 develops a time constant for the desired lag in the response of the system to changes introduced by the pilot at potentiometer tap 114.

The gate 136 serves to either charge or discharge capacitor 151 at a rate controlled by the magnitude and direction of change in the position of tap 114. The circuit comprising capacitor 154 and resistor 155 transmits the unbalance signal from the sample and hold circuit involving capacitor 151 to the input of amplifier 132; it transmits only the AC components of the unbalanced signal. Capacitor 154 and resistor 155 comprise the washout circuit described previously. When the pilot shifts the control stick to a different position, the voltage applied to terminal 131 is a measure of the magnitude and direction of the change in position. The time constant of the circuit comprising capacitor 154 and resistor 155 is of the order of 2 to 3 seconds.

The signal from the feedback transducer 50 is applied by way of an attenuator pad 160 to terminal 131. A balance voltage is applied from a potentiometer 117 and also by way of an attenuating pad 162 and a resistor 163 to terminal 131. Terminal 131 is connected to ground by way of a resistor 164. With no unbalance signal present in the system, the voltage from potentiometer 117 is applied to terminal 131 in an amount exactly equal to the DC bias applied to an input terminal 165 of amplifier 132.

In the pulse generator 98, the 400 cycle voltage is applied by way of resistor 170 to a Zener diode 171 which clips the peaks of the voltage wave and maintains a relatively constant reference voltage. The positive going waves are passed by way of diode 172 to the base electrode of a transistor 173. The transistor 173 generates a spacer pulse which is applied to transistor 174 by way of diode 175. The time delay is such that a positive going pulse of 0.0002 seconds is generated at the collector of transistor 174 and applied by way of a line 176 and diode 177 to the input terminal 131 of the amplifier 132 of fixed high gain. The positive going pulse is also applied to the base of a transistor 178 whose output is a negative going pulse of 0.0002 seconds duration. The latter pulse is applied by way of a line 179 from the cathode electrode of the transistor 178 and by way of diode 180 to the input terminal 165.

The positive and negative going pulses applied to amplifier 132 serve to actuate the amplifier 132 for relatively short intervals during each cycle. For example, the period of the 400 cycle input signal is 2.5 milliseconds whereas the gating pulses centered at the positive and negative half cycles are 0.0002 seconds. The unbalance signal which may be applied to terminal 131 from either the gyro 20, the potentiometer 114, or the feedback transducer 50 will thus be amplified in amplifier 132. Amplifier 132 comprises three stages 191, 192 and 193. The emitter electrode of the output stage 193 is connected by way of channel 194 to the center tap of an input transformer 195 of a bilateral gate 196. Gate 196 is in all essential characteristics the same as gate 136 including a sample and hold capacitor 197. The voltage across the capacitor 197 is applied to the input of a Darlington connected pair of transistors 199 and 200. The collector electrode of the output transistor 200 is connected by way of resistor 201 to one terminal of the torque motor winding 112. The other terminal of the torque motor winding 112 is connected by way of a resistor 202 to the emitter electrode of transistor 193 and by way of resistor 203 to ground. Negative gating pulses are applied to the gate 196 by way of conductor 204. The circuit operates such that during the period of the negative going pulses on channel 204 a voltage is stored on capacitor 197. This voltage is then compared with the voltage appearing at the emitter of transistor 193 during the remainder of each cycle The difference in voltage is representative of the current which flows through the torque motor winding 112. This voltage may be either positive or negative and thus may be employed to control a flapper in a conventional hydraulic actuator. When no current flows through the torque motor winding 112, the flapper in the first stage of a hydraulic actuator, such as actuator 16, is in a balanced position. Positive or negative current flowing in the winding 112 will change the position of the flapper in the hydraulic actuator to cause the actuator to make a suitable change in the control system.

It will now be seen that the compensating networks 24 and 38 of FIG. 1 have been consolidated in FIG. 10. That is, the command signal from tap 114 and the error signal from the gyro 20 pass through the same lag network wherein the lag is controlled by condenser 151. They pass through a first gating amplifier stage 152 and thence through the washout circuit which includes condenser 154 and resistor 155. Terminal 131 represents the summation point for signals from the washout circuit and from the feedback actuator transducer 16, the signal from the latter transducer being applied to terminal 116.

The use of one lag circuit and one washout circuit for both the command signal and the error signal assures identical phase and amplitude responses and permits introduction of a command from lever 10 without compromise or alteration of the gain of amplifier 132.

Where desired, separate lag and washout circuits may be employed.

Further, only one channel has been shown, it being understood that such a channel will be provided for each of the yaw, roll and pitch axes in a complete stability control augmentation system.

While a preferred embodiment of the invention, together with modifications thereof, has been described in detail herein and shown in the accompanying drawing, it will be evident that various further modifications are possible in the arrangement and construction of its components without departing from the scope of the invention.

I claim:

1. An aircraft control system for selectively establishing and maintaining an attitude rate in the presence of disturbing forces from wind gusts, weapon recoil, and the like, which comprises:
    a. a control loop including said aircraft, a reference element coupled to said aircraft, first signal coupling means connected to said reference element, a fixed high gain amplifier for amplifying error signals from said coupling means and an actuator responsive to signals from said amplifier for continuous control of said attitude rate;
    b. a manual input element for introducing a command for a desired change in attitude rate including transducer means to produce a command signal, and
    c. second coupling mans for applying said command signal with said error signal for amplification in said amplifier to produce a specific aircraft attitude rate response independent of the response of said control loop to said disturbing forces.

2. The combination set forth in claim 1 wherein said coupling means apply said command signal and said error signal to the input to said amplifier with time delays and frequency responses which bear predetermined relationships to each other.

3. The combination set forth in claim 2 wherein said coupling means have the same time delays and the same frequency responses.

4. The combination set forth in claim 2 in which said coupling means are common to the signal paths for both said error signal and said command signal.

5. In a control and stabilization system for a vehicle, the combination comprising:
    a feedback system having an outer feedback loop which includes said vehicle and responsive to external forces applied to thereto to provide stabilization relative to an established course, said feedback system also including an inner control feedback loop responsive to the amount of stabilizaiton provided by said first feedback loop, and
    a feedforward control loop including a command element and means responsive to commands applied to the vehicle and having a fixed high gain amplifier means common to said inner loop for controlling the course of travel of the vehicle, and
    a compensating network having a lag and washout circuit in said outer feedback loop which also forms a lag and washout circuit in said feedforward control loop.

6. A control and stabilization system for a vehicle, the combination comprising:
    pilot control means for controlling the direction of travel of said vehicle,
    actuating means having a mechanical input proportional to a desired rate of change in direction of travel of said vehicle coupled to said control means for establishing the position of said actuating means,
    first transducer means for detecting the rate of divergence of said vehicle from an established direction of travel,
    a fixed high gain amplifier completing a feedback loop between said transducer means and said actuating means for applying a signal to said actuating means proportional to rate of deviation of said vehicle from its established direction of travel to restore said vehicle to said established direction of travel, means responsive to the output of said actuating means and coupled to said amplifier for returning the output of said amplifier to zero, and second transducer means responsive to said control means and connected to said amplifier for applying to said amplifier a signal proportional to a desired rate of change in direction of said vehicle.

7. A control and stabilization system as set forth in claim 6 wherein said detecting means includes a rate gyro coupled to said vehicle and wherein a compensating network is responsive to the output of said first transducer and to said second transducer and tailors the transfer function of said feedback loop to be greater than the transfer function of said vehicle throughout the significant control/response range of said vehicle.

8. A system for control and stabilization of a helicopter having control surfaces, the combination comprising:
   a pilot actuated lever for generating a signal proportional to a desired rate of change in direction of travel,
   an actuator responsive to movement of said lever for generating a mechanical movement proportional to the signal generated by said lever,
   a control system coupled to the control surfaces of said helicopter and responsive to the output of said actuator,
   a rate gyro coupled to said helicopter for generating a signal proportional to the rate of deviation of said helicopter from a reference direction of travel,
   a feedback transducer responsive to the output of said actuator for generating a signal proportional to the output thereof,
   a command signal transducer coupled to said lever for generating a signal proportional to the movement thereof, and
   fixed high gain amplifier means coupled at its input to the outputs of said rate gyro, said feedback transducer, and said command transducer for applying a signal to said actuator proportional to the sum of the signals applied to said input.

9. The method of control of attitude rate of a craft which comprises:
   a. generating a high constant gain feedback signal dependent upon outside disturbances on said craft,
   b. generating a control signal by manual actuation of a control element,
   c. generating a feedforward signal in response to said control signal, and
   d. mixing said feedforward signal and said feedback signal with like time lag and frequency characteristics to modify the change rate without alteration of the response of said feedback loop to outside disturbances.

10. A control and stabilization system for an aircraft which comprises:
    a. an airframe,
    b. pilot steering means,
    c. a stability feedback loop including means for generating a first signal dependent upon the rate of movement of the aircraft relative to a given axis, control surface actuating means connected to be mechanically responsive to said steering means and fixed high gain means for treating said first signal for driving said actuating means in accordance with a transfer function greater than the transfer function of said airframe through the significant control/response range of said airframe, and
    d. means for generating a second signal in response to movement of said steering means, and
    e. coupling means for applying said second signal to said fixed high gain means in said stability loop to produce an airframe rate response about said given axis proportionate to movement of said pilot control input means throughout the significant control/response range of said airframe.

11. In an aircraft stability and control augmentation system, the combination comprising:
    a. an airframe of controllable attitude,
    b. a control system including an attitude stabilizing feedback loop including airframe attitude rate detecting means, a first signal generating means responsive to said attitude rate detecting means, and actuating means operative to control attitude of said airframe and responsive to said first signal generating means,
    c. fixed high gain amplifier means in said stabilizing feedback loop to establish gain in said loop throughout the significant control/response range of said airframe sufficient to dominate the response characteristics of the airframe to outside disturbances within said range,
    d. a pilot input means including pilot steering means, and a second signal generating means responsive to changes in position of said steering means,
    e. means connecting said second signal generating means to said amplifier means,
    f. means connecting said actuating means to said steering means for producing a proportionate airframe rate response throughout the significant control/response range of said airframe to movement of said steering means.

12. A system for control and stabilization of a helicopter having control surfaces, the combination comprising:
    a pilot actuated lever for generating a signal proportional to a desired rate of change in direction of travel,
    an actuator response to movement of said lever for generating a mechanical movement proportional to the signal generated by said lever,
    a control system coupled to the control surfaces of said helicopter and responsive to the output of said actuator,
    a rate gyro coupled to said helicopter for generating a signal proportional to the rate of deviation of said helicopter from a reference direction of travel,
    a feedback transducer responsive to the output of said actuator for generating a signal proportional to the output thereof,
    a command signal transducer coupled to said lever for generating a signal proportional to the movement thereof,
    a time lag circuit coupled at its input to the output of said gyro and said command transducer,
    first amplifier means connected to said lag circuit,
    a washout circuit connected to the output of said first amplifier means, and
    second amplifier means connected at its input to the output of said washout circuit and to the output of said feedback transducer for applying a feedback signal to said actuator proportional to the sum of the signals applied to said input.

13. A helicopter control and stabilization system as set forth in claim 12 including:
    a first bilateral gate connected to the input of said first amplifier,
    a second bilateral gate connected to the output of said second amplifier, and
    a synchronizing pulse generator connected to said first bilateral gate, to the input of said second amplifier, and to said second bilateral gate.

14. A helicopter control and stabilization system as set forth in claim 13 wherein said pulse generator includes means for generating negative going pulses connected to said first and second bilateral gates and the input of said second amplifier, and means for generating positive going pulses connected to the input of said second amplifier.

15. A helicopter control and stabilization system as set forth in claim 13 wherein said lag circuit includes two parallel resistors connected to one side of said first bilateral gate and a capacitor connected to the opposite side of said first bilateral gate.

16. A helicopter control and stabilization system as set forth in claim 15 wherein said washout circuit includes a capacitor in series with a resistor connected to the output of said first amplifier and the input of said second amplifier.

PO-1050
(5/69)

UNITED STATES PATENT OFFICE
CERTIFICATE OF CORRECTION

Patent No. 3,584,814   Dated June 15, 1971

Inventor(s) Milford R. Murphy

It is certified that error appears in the above-identified patent and that said Letters Patent are hereby corrected as shown below:

| | | |
|---|---|---|
| Col. 1, line 63, | change "disturbance" to --disturbances--. | |
| Col. 2, line 30, | change "above system" to --above control system--. | |
| Col. 3, line 6 | change "determined the design" to --determined by the design--; | |
| line 67 | change the formula so that it reads as follows: | |

$$(\theta_t - H\psi)G_1 = \psi$$

line 68    change the formula so that it reads as follows:

$$\psi/\theta_t = G_3 = \frac{G_1}{1+G_1 H}$$

| | | |
|---|---|---|
| line 72 | change "functions" to --function--; |
| line 74 | change "determined the basic" to --determined by the basic--. |
| Col. 4, line 18 | change "the" to --then--; |
| line 68 | change "tow" to --two--; |
| line 75 | change "consideration" to --considerations--. |
| Col. 5, line 32 | change "1H" to --1/H--. |
| Col. 6, line 28 | after "network 24" and before "in" delete "is"; |
| line 44 | change "portions" to --portion--; |
| line 65 | change "network 66 is the" to --network 66 in the--. |

PO-1050
(5/69)

UNITED STATES PATENT OFFICE
CERTIFICATE OF CORRECTION

Patent No. 3,584,814            Dated June 15, 1971

Inventor(s) Milford R. Murphy

It is certified that error appears in the above-identified patent and that said Letters Patent are hereby corrected as shown below:

Col. 7, line 17,    After "$G_e$" change "function" to --involves--;

line 74,    change "transfer functions" to --transfer function--.

Col. 8, line 1    change the formula so that it reads as follows:

$$G_e + G_m = \frac{-0.64(12.5S + 1)}{S^2(0.125S + 1)}$$

line 28    after "amplifier 132" insert --.--;

line 36    change "outer" to --other--;

line 67    change "AC components" to --AC component--.

Col. 9, line 51    after "cycle" insert --.--;

line 58    change "current flowing" to --currents flowing--.

Col. 10, line 18    after "attitude rate" insert --reference--;

line 30    change "coupling mans" to --coupling means--;

line 51    after "applied" and before "thereto" delete "to".

Signed and sealed this 9th day of November 1971.

(SEAL)
Attest:

EDWARD M. FLETCHER, JR.        ROBERT GOTTSCHALK
Attesting Officer               Acting Commissioner of Patents